US011485428B2

(12) United States Patent
da Rosa

(10) Patent No.: US 11,485,428 B2
(45) Date of Patent: Nov. 1, 2022

(54) BREAKAWAY SYSTEM FOR CAPTIVE BEAM SYSTEM

(71) Applicant: Ancra International LLC, Azusa, CA (US)

(72) Inventor: Joaquim Carlos da Rosa, Independence, KY (US)

(73) Assignee: ANCRA INTERNAITONAL LLC, Azusa, CA (US)

(*) Notice: Subject to any disclaimer, the term of this patent is extended or adjusted under 35 U.S.C. 154(b) by 346 days.

(21) Appl. No.: 16/795,837

(22) Filed: Feb. 20, 2020

(65) Prior Publication Data
US 2020/0269936 A1 Aug. 27, 2020

Related U.S. Application Data

(60) Provisional application No. 62/810,734, filed on Feb. 26, 2019.

(51) Int. Cl.
B62D 33/08 (2006.01)
B62D 33/10 (2006.01)
B62D 33/04 (2006.01)
B62D 25/20 (2006.01)
B60P 1/02 (2006.01)
B60P 3/08 (2006.01)
B60P 3/10 (2006.01)

(52) U.S. Cl.
CPC ............ B62D 33/08 (2013.01); B62D 33/10 (2013.01); B60P 1/02 (2013.01); B60P 3/08 (2013.01); B60P 3/10 (2013.01); B62D 25/2054 (2013.01); B62D 33/04 (2013.01); B62D 33/042 (2013.01)

(58) Field of Classification Search
CPC ...... B62D 33/04; B62D 33/042; B62D 33/08; B62D 25/2054; B60P 1/00; B60P 1/02; B60P 1/30; B60P 3/08; B60P 3/10; B60P 7/15; B61D 45/00; B61D 45/001; B61D 7/00
USPC .......... 296/24.4, 184.1, 193.07; 410/89, 143, 410/148, 150
See application file for complete search history.

(56) References Cited

U.S. PATENT DOCUMENTS 7,578,644 B2 * 8/2009 Squyres ............... B61D 45/007
410/144
8,979,451 B2 3/2015 Downing
2004/0007701 A1 1/2004 Goulet
(Continued)

FOREIGN PATENT DOCUMENTS

AU 626882 B2 * 8/1992 ................ B60P 3/08
CN 106428077 A * 2/2017 ........... B61D 45/001

OTHER PUBLICATIONS

Zeng, "Railway wagon and load limiting device thereof", Feb. 22, 2017, European Patent Office, Edition: CN106428077A (Year: 2017).*

(Continued)

Primary Examiner — Dennis H Pedder
Assistant Examiner — Joyce Eileen Hill
(74) Attorney, Agent, or Firm — Crowell & Moring LLP

(57) ABSTRACT

A breakaway system for use with a decking system may include a bracket that is configured to be capable of sliding along a track and a carrier that is releasably coupled to the bracket. The bracket and the carrier may be configured to be separated when an upward force is applied upon the bracket and not upon the carrier.

20 Claims, 12 Drawing Sheets

(56) References Cited

U.S. PATENT DOCUMENTS

| | | | |
|---|---|---|---|
| 2010/0219660 A1* | 9/2010 | Rasmussen | F16M 13/02 296/156 |
| 2015/0110568 A1* | 4/2015 | Squyres | B60P 7/15 410/89 |
| 2018/0118408 A1* | 5/2018 | Bradley | B65D 19/385 |

OTHER PUBLICATIONS

International Search Report and Written Opinion for PCT/US2020/019011 dated May 18, 2020, 7 pgs.

* cited by examiner

BREAKAWAY SYSTEM FOR CAPTIVE BEAM SYSTEM

PRIORITY CLAIM

This invention claims the benefit of priority of U.S. Provisional Application Ser. No. 62/810,734, entitled "Breakaway System for Captive Beam System," filed Feb. 26, 2019, the disclosure of which is hereby incorporated by reference in its entirety.

TECHNICAL FIELD

The present disclosure relates to a breakaway system that may be used in various automatic control systems, such as remotely adjustable captive beam systems. Captive beam systems include decking beams with components that slide within vertical tracks fixed to opposite walls of a cargo compartment. The beam can be stowed close to the ceiling of the cargo compartment when not needed for use, and can be selectively lowered to a position for loading cargo or for shoring purposes. The ends of the beams slide within the tracks and include locking features that can selectively position the ends of the beams with respect to the tracks at various heights along the tracks. The adjustment of height of captive beams may be automatically controlled to allow a single operator to efficiently load or unload a cargo compartment.

BRIEF SUMMARY OF THE INVENTION

One general aspect of the present disclosure includes a remotely adjustable decking system, including first and second vertical tracks that are configured to be installed upon opposing walls of a cargo compartment, the first and second vertical tracks each include a plurality of apertures disposed spacingly therealong; first and second brackets that each slide along the respective first and second tracks; first and second carriers that each are releasably coupled to the respective first and second brackets, and where the first and second carriers slide within the respective first and second tracks; at least one motor that is disposed in conjunction with the respective first and second tracks, where the at least one motor is operatively engaged with the respective first and second carriers through a drive system that is urged to move by the at least one motor, wherein operation of the at least one motor in a first direction causes the respective carrier and the respective bracket, when the respective bracket is coupled to the respective carrier, to slide upwardly along the respective track, and operation of the at least one motor in an opposite second direction causes the respective carrier and the respective bracket, when the respective bracket is coupled to the respective carrier, to slide downwardly along the respective track; and a controller with user input capability, where the controller selectively controls the operation of the at least one motor to selectively raise or lower a vertical position of one or both of the first and second carriers upon the respective first and second tracks in response to an input received from an input device.

Another general aspect of the present disclosure includes a breakaway system for use with a decking system, including a bracket that is configured to be capable of sliding along a track; and a carrier that is releasably coupled to the bracket, where the bracket and the carrier are configured to be separated when an upward force is applied upon the bracket and not upon the carrier.

Other systems, methods, features and advantages of the invention will be, or will become, apparent to one with skill in the art upon examination of the following figures and detailed description. It is intended that all such additional systems, methods, features, and advantages be within the scope of the invention, and be encompassed by the following claims.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like-referenced numerals designate corresponding parts throughout the different views.

DETAILED DESCRIPTION

Figure 1:
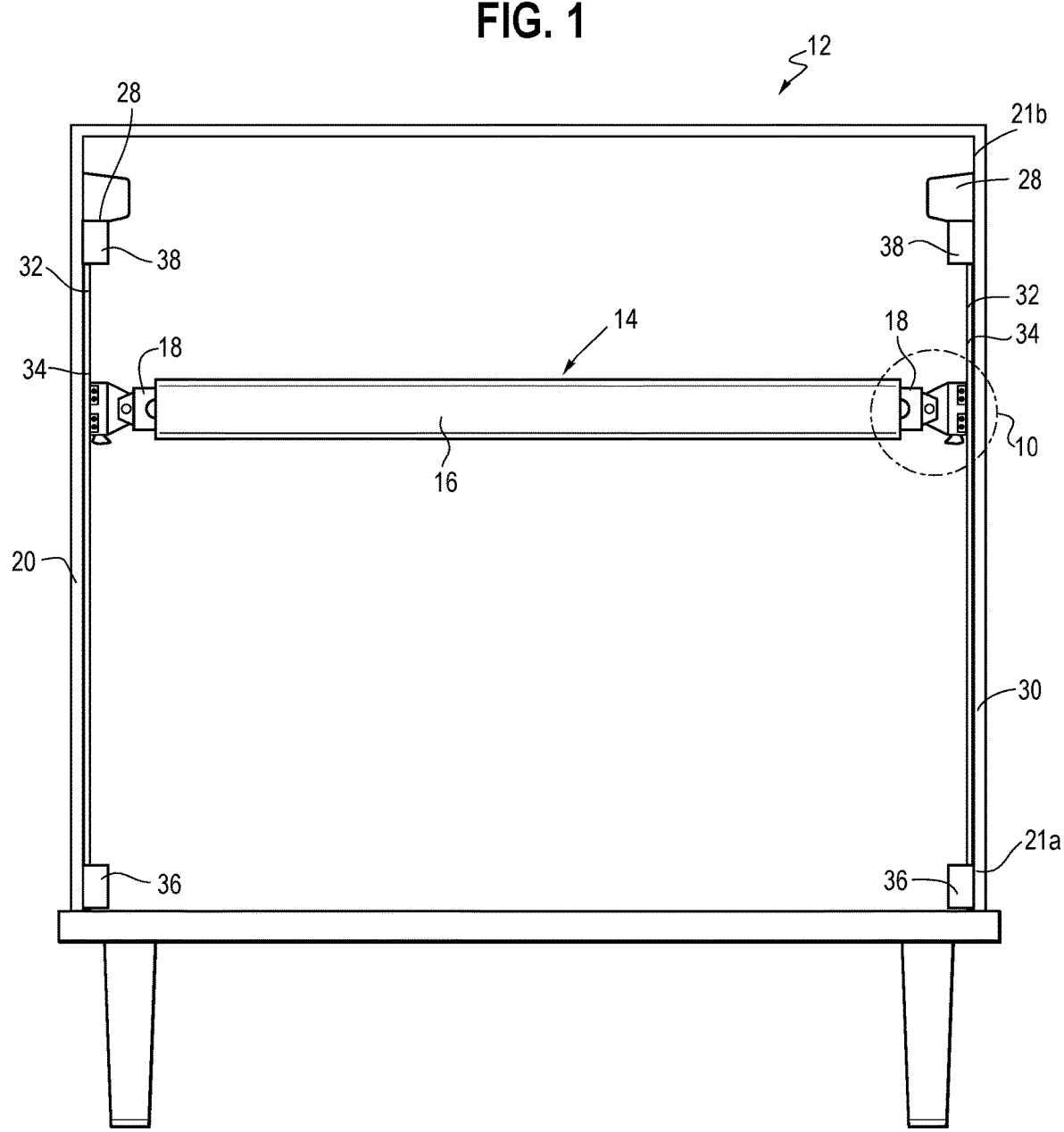
FIG. 1 is a schematic rear view of a captive beam system connected to opposite sidewalls of a cargo compartment, such as a trailer, in accordance with certain aspects of the present disclosure.
Figure 2:
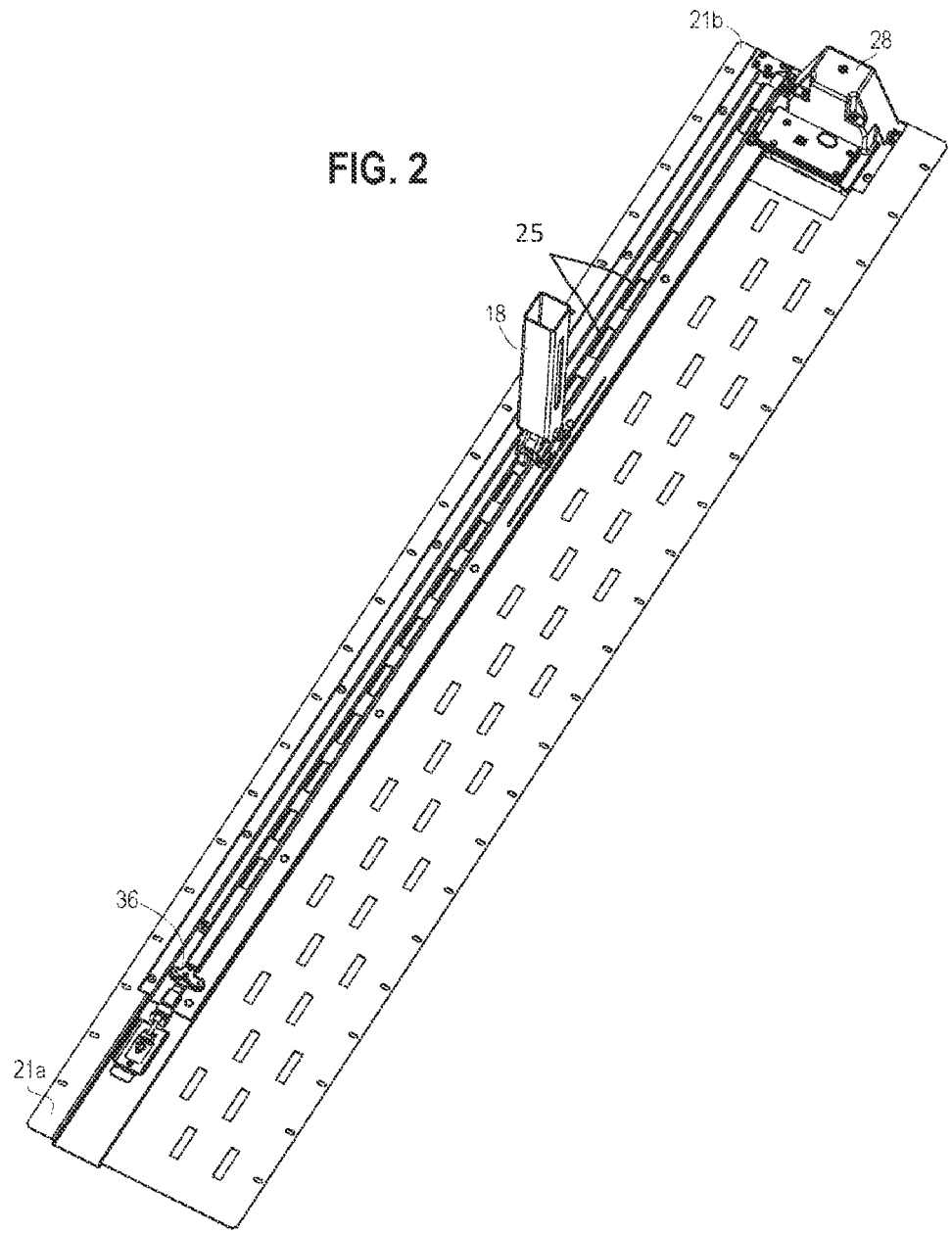
FIG. 2 is a perspective view of one track and a collar assembly (collar, bracket, latch) connected to an aperture in the track with the bracket coupled to a carrier in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional material, construction, and assembly.

A breakaway system 10 for use with a remotely adjustable decking system 12 is shown in FIGS. 1-12. While a remotely adjustable decking system 12 is specifically described herein, the breakaway system 10 may be successfully implemented for use with other automatic control systems that are configured to automatically raise or lower an assembly of the automatic control system for decking or other uses such as transportation, storage, and the like. For the sake of brevity, an automatic control system disclosed herein is described and depicted as a remotely adjustable decking system, one of ordinary skill in the art, with a thorough review of the subject specification and figures, will readily comprehend how the breakaway system may be implemented for use with other automatic control systems for safety purposes and will readily comprehend which other automatic control systems might be suitable without undue experimentation.

Referring to FIGS. 1-6, the remotely adjustable decking system 12 may include first and second tracks 20, 30 that are disposed upon opposite sides of a cargo compartment and may also include a beam assembly 14 extending between the first and second tracks 20, 30. The beam assembly 14 may include an elongate beam 16, and two collars 18, which may be telescopingly mounted to the beam 16 to allow the length of the beam 16 to selectively extend (when the beam is at an angle) and shorten (when the beam is horizontal). Each collar 18 may be connected to a bracket 22, such as with a pinned connection or other types of connections. The collar 18 may be pivotable with respect to the bracket 22.

Figure 3:
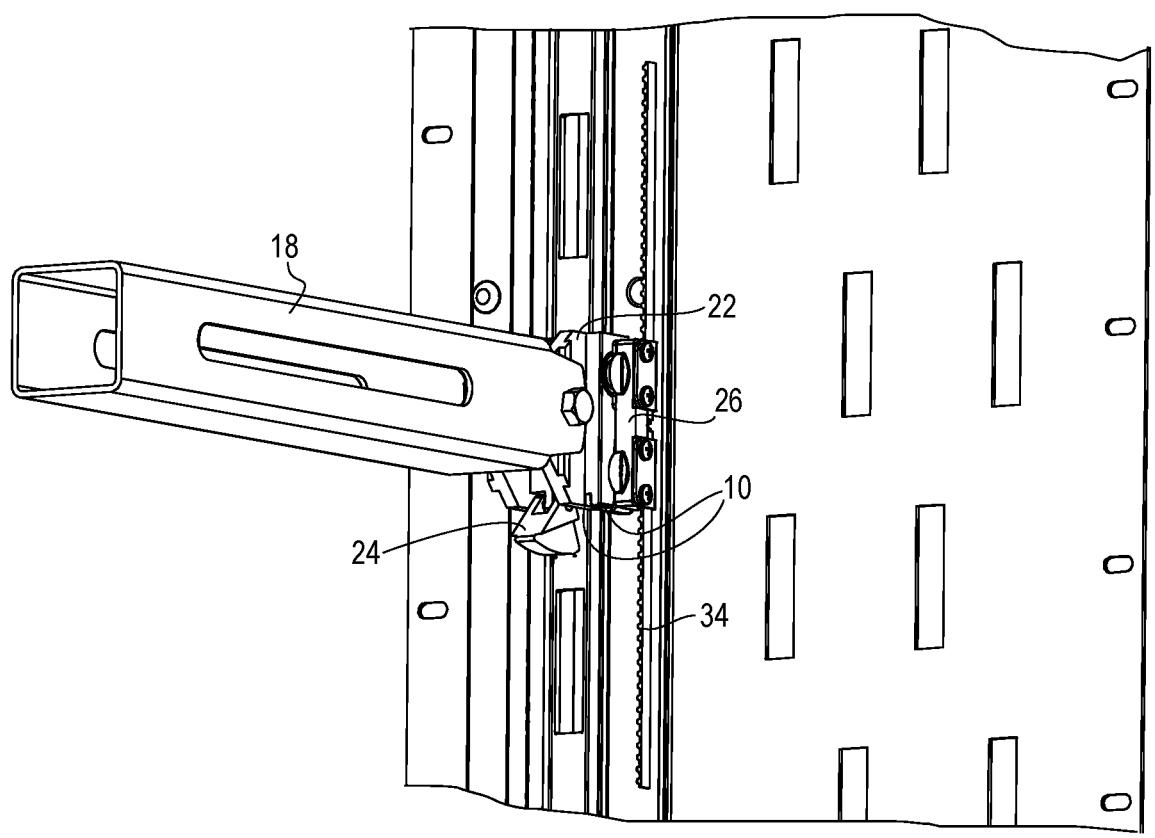
FIG. 3 is a perspective view of the bracket aligned and coupled with the carrier through aligners and a connector such that the bracket and the carrier are capable of being moved together with respect to the track by a drive system.
Figure 12:
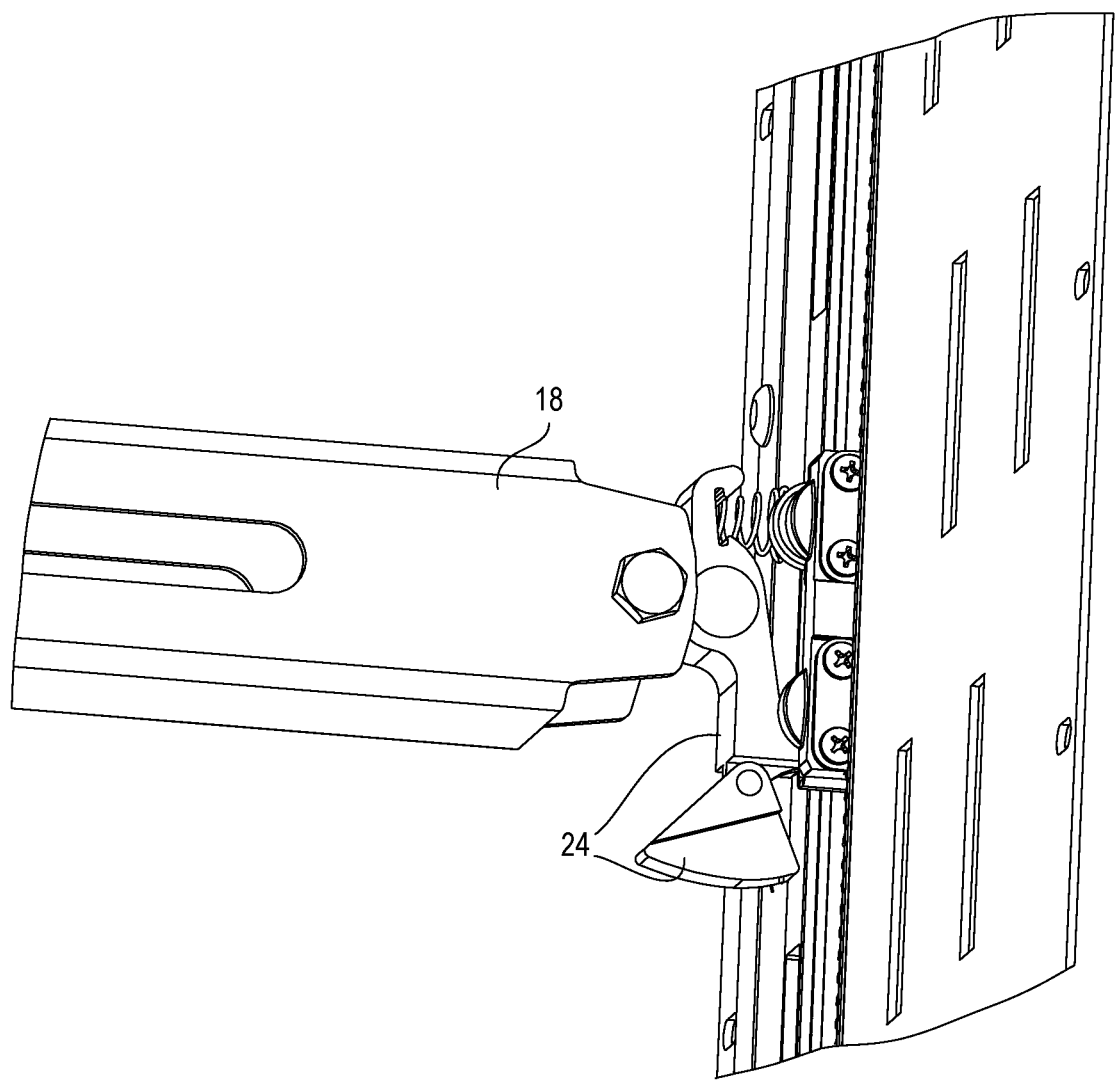
FIG. 12 is a perspective view of the latch of the collar assembly secured to an aperture of the track in accordance with certain aspects of the present disclosure.

Each bracket 22 may include a latch system 24 (e.g., as shown in FIGS. 3 and 12) that may slide along the corresponding track to maintain the connection between the bracket 22 and the track 20, 30 along the length of the track 20, 30 (i.e. when the beam assembly 14 is secured at a selected position corresponding to an aperture 25 in the track 20, 30 and when the beam assembly 14 is stowed near the ceiling of the cargo compartment when not in use). Example configurations of the latch system 24 and methods of using the latch system 24 to automatically adjust the position of the beam assembly 14 with respect to the tracks 20, 30 are described in U.S. non-provisional application Ser. No. 16/285,949, entitled "REMOTELY ADJUSTABLE CAPTIVE BEAM SYSTEM," being filed on the same day as the present application, which is hereby incorporated by reference in its entirety.

Each of the first and second tracks 20, 30 may have a plurality of apertures 25 spaced along the length of the track. Each of the first and second tracks 20, 30 may receive a bracket 22 slidable therealong. Each bracket 22 may be releasably coupled to a carrier 26, and thereby forming the breakaway system 10. Each bracket 22 coupled to the carrier 26 (the breakaway system 10) may be slidable along the length of the respective track and selectively moved upward and downward with a motor 28, which when operating moves the position of the carrier 26 (and thus the bracket 22 coupled to the carrier 26) upon the respective track via a drive system 32.

While each vertical track 20, 30 and breakaway system 10 may be engaged with and controlled by a dedicated motor 28 via a dedicated drive system 32, for the sake of brevity, the construction and operation of a single breakaway system 10 will be discussed herein. One of ordinary skill in the art will understand that the corresponding breakaway system 10 that is connected to the opposite end of the beam assembly 14 from the breakaway system 10 being discussed in detail herein may be constructed and operate in the same manner (and with the same drive system and motor or with differing drive systems and motors). In embodiments where the user desires to move the beam assembly 14 to another position but maintain the beam assembly 14 in a horizontal configuration, both breakaway systems 10 that are connected to opposite ends of the same beam assembly 14 will be moved in exact same manner as discussed herein. In other embodiments, where the user may wish to move and/or retain the beam assembly 14 at an angle (i.e. not in a horizontal orientation), a controller will operate the motors 28 corresponding to the opposite ends of the beam assembly 14 in different manners to align the beam assembly 14 at an angle as desired, i.e. to achieve a resting position where the latch systems 24 of the first and second brackets 22 that are associated with opposite first and second tracks 20, 30 respectively rest upon the lower edges of apertures at different heights on the opposite tracks. A controller with user input capability and the method of using the controller to selectively control the operation of the motors to selectively raise or lower a beam assembly are described in U.S. non-provisional application Ser. No. 16/285,949, entitled "REMOTELY ADJUSTABLE CAPTIVE BEAM SYSTEM," being filed on the same day as the present application, which is hereby incorporated by reference in its entirety.

The drive system 32 may be a belt drive (with pulleys), a chain drive, a screw drive, or a pneumatic/hydraulic drive system to automatically raise and lower the carrier 26 (and also the bracket 22 coupled to the carrier 26). In some embodiments, as shown in FIGS. 2-6, where the drive system 32 is a belt drive, the belt drive may include a belt 34 (e.g., a timing belt). The belt 34 (used inclusively herein to refer to a belt or a chain) may be attached to the carrier 26 and may be wrapped around a lower pulley 36 proximate to the lower end 21a of the track and an upper pulley 38 proximate to the upper end 21b of the track, and around the shaft 40 of a motor 28, such that rotation of the motor shaft 40 in a first direction causes the belt 34 to pull the carrier 26 (and thus the bracket 22 coupled to the carrier 26) upward, and operation of the motor 28 in the opposite direction causes the belt 34 to pull the carrier 26 downward along the track, which allows the bracket 22 coupled to the carrier 26 to move downward together with the carrier 26 due to gravity and an alignment force (discussed in greater detail below) between the bracket 22 and the carrier 26.

Figure 4:
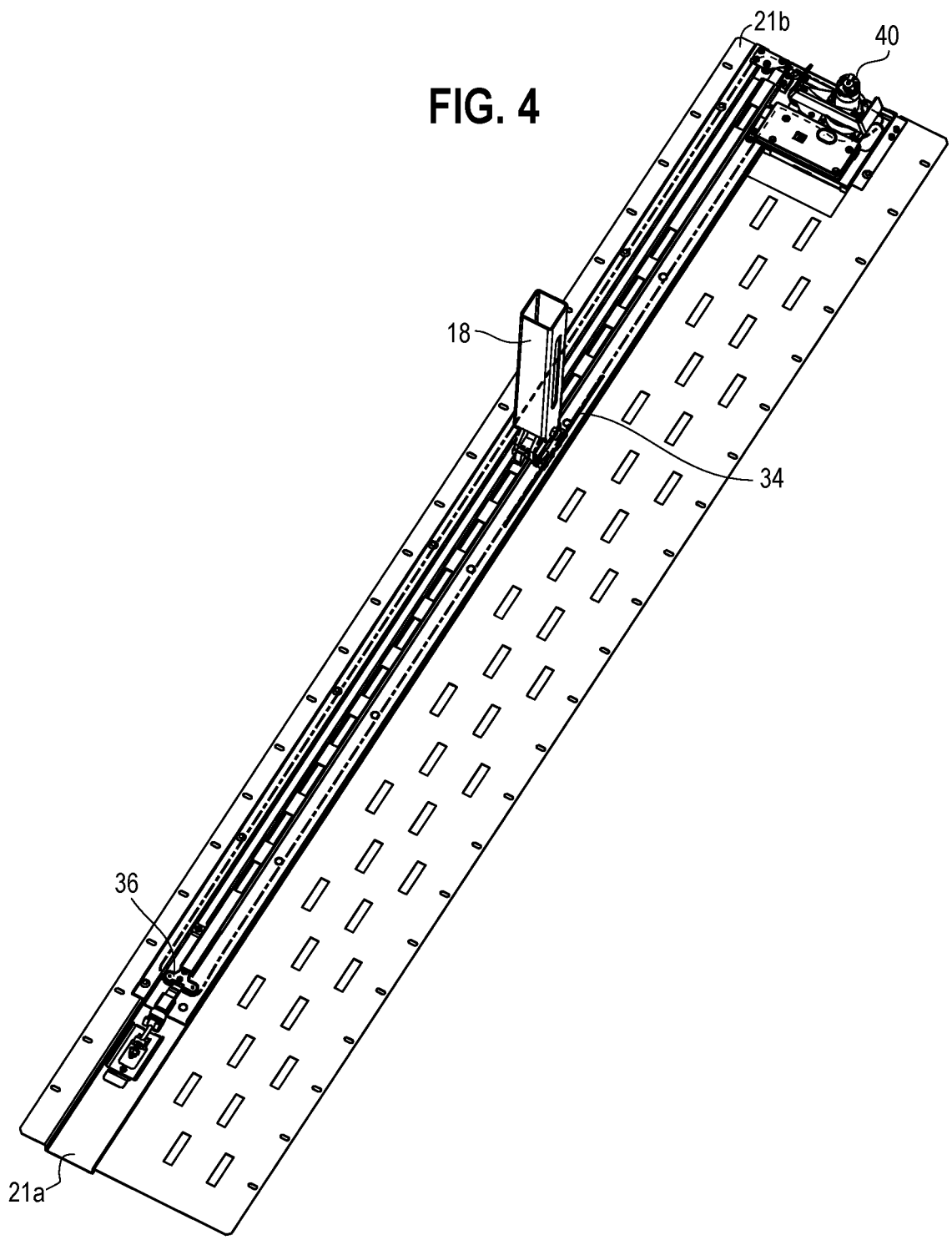
FIG. 4 is perspective view of one track and a breakaway system attached to a drive system, schematically depicting a drive system including a belt wrapped around a set of pulleys and fixed with respect to the carrier in accordance with certain aspects of the present disclosure.
Figure 5:
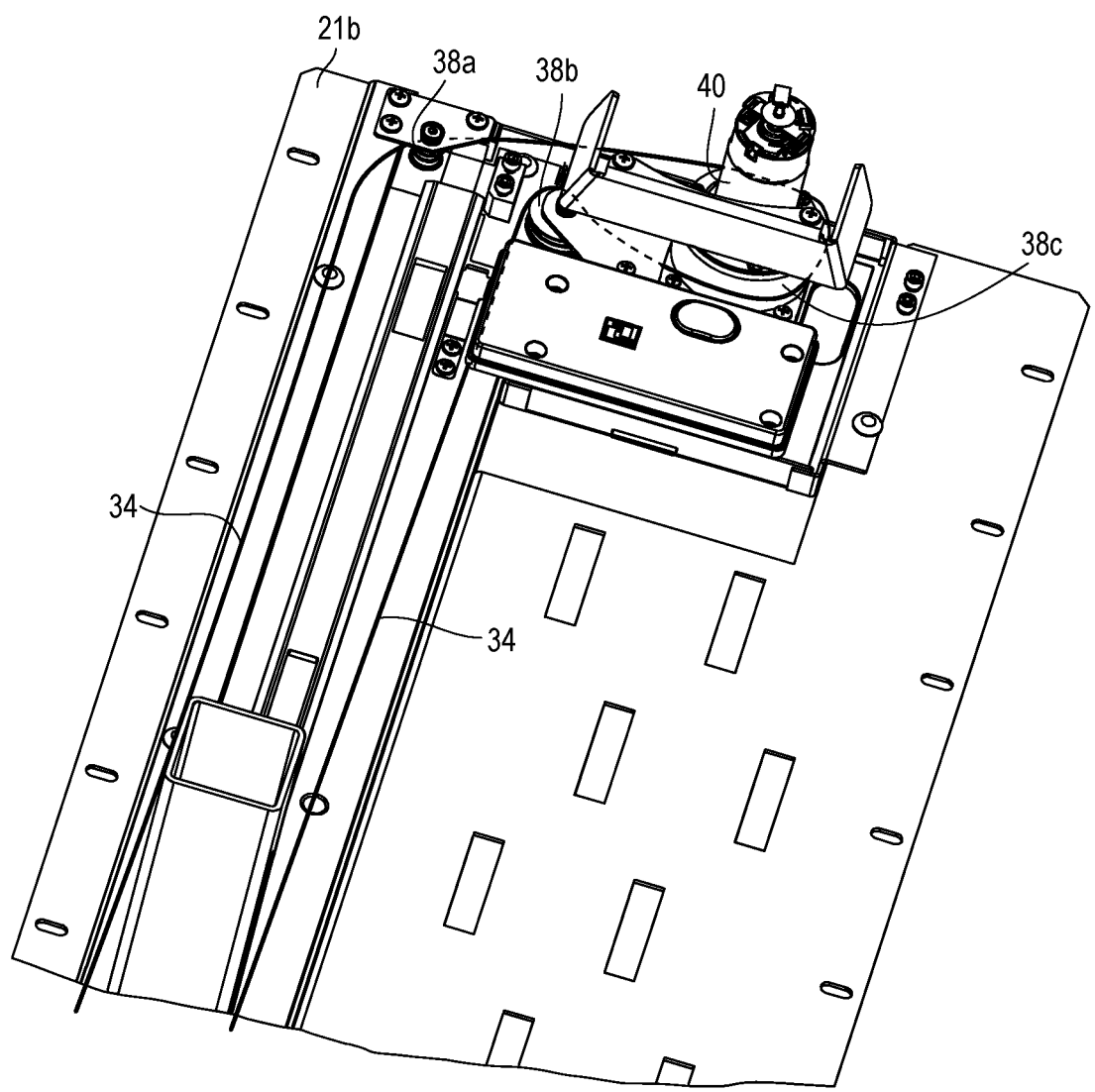
FIG. 5 is an enlarged partial perspective view of a portion of the drive system of FIG. 4, schematically depicting the belt wrapping around the upper pulleys in accordance with certain aspects of the present disclosure.
Figure 6:
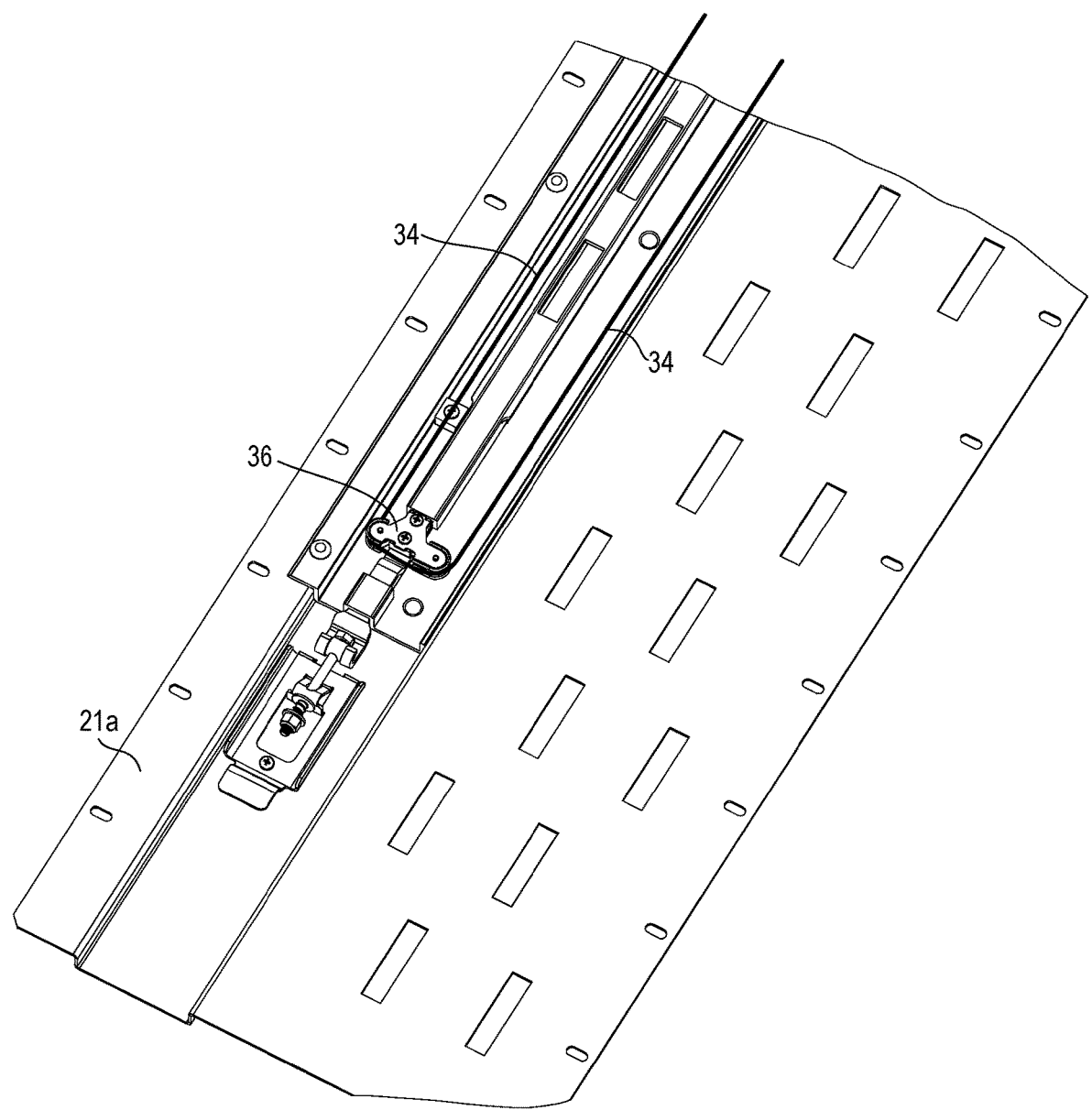
FIG. 6 is an enlarged partial perspective view of a portion of the drive system of FIG. 4, schematically depicting the belt wrapping around the lower pulleys in accordance with certain aspects of the present disclosure.
Figure 7:
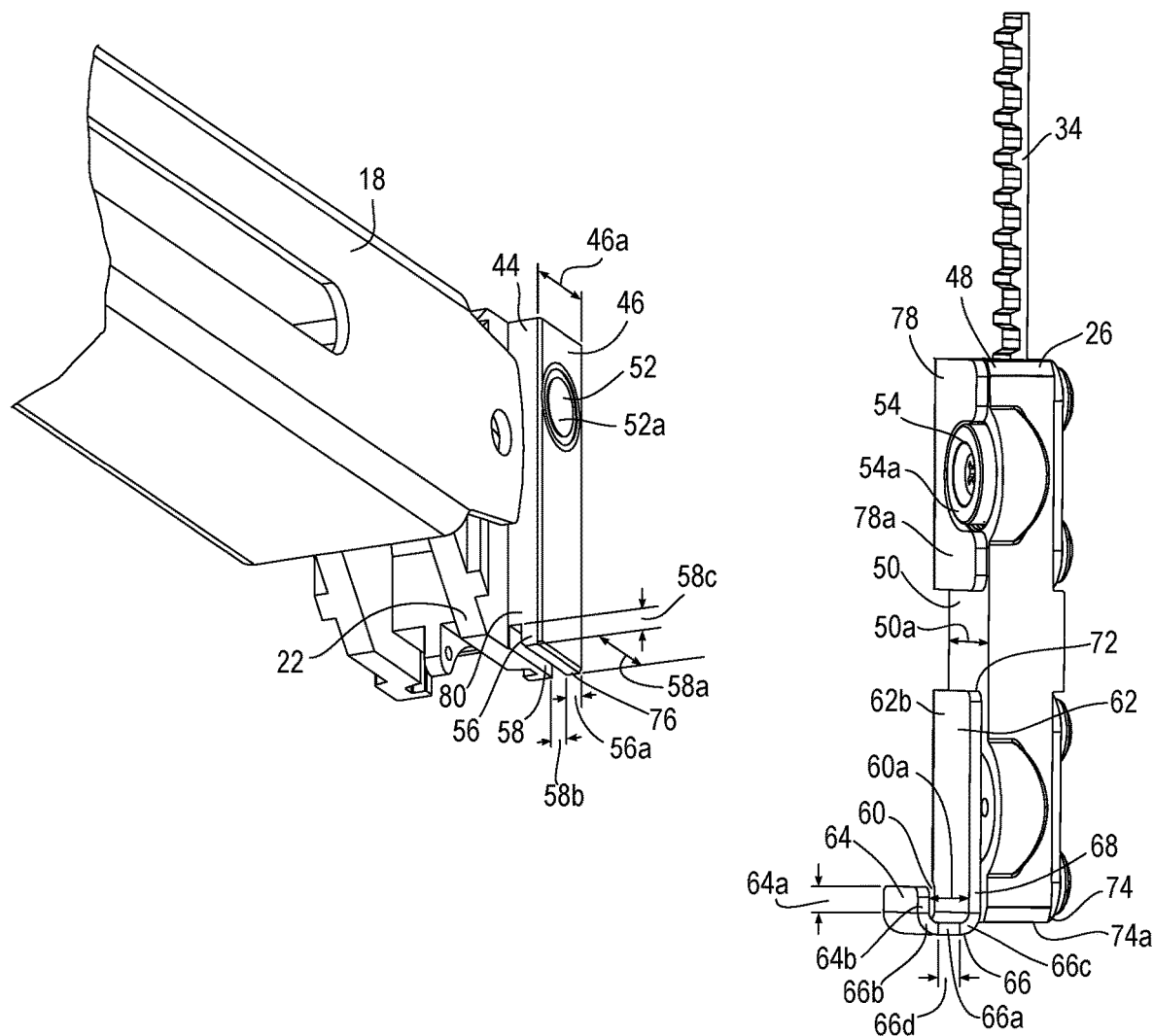
FIG. 7 is an enlarged perspective view of the bracket and the carrier of FIG. 3 in accordance with certain aspects of the present disclosure.
Figure 8:
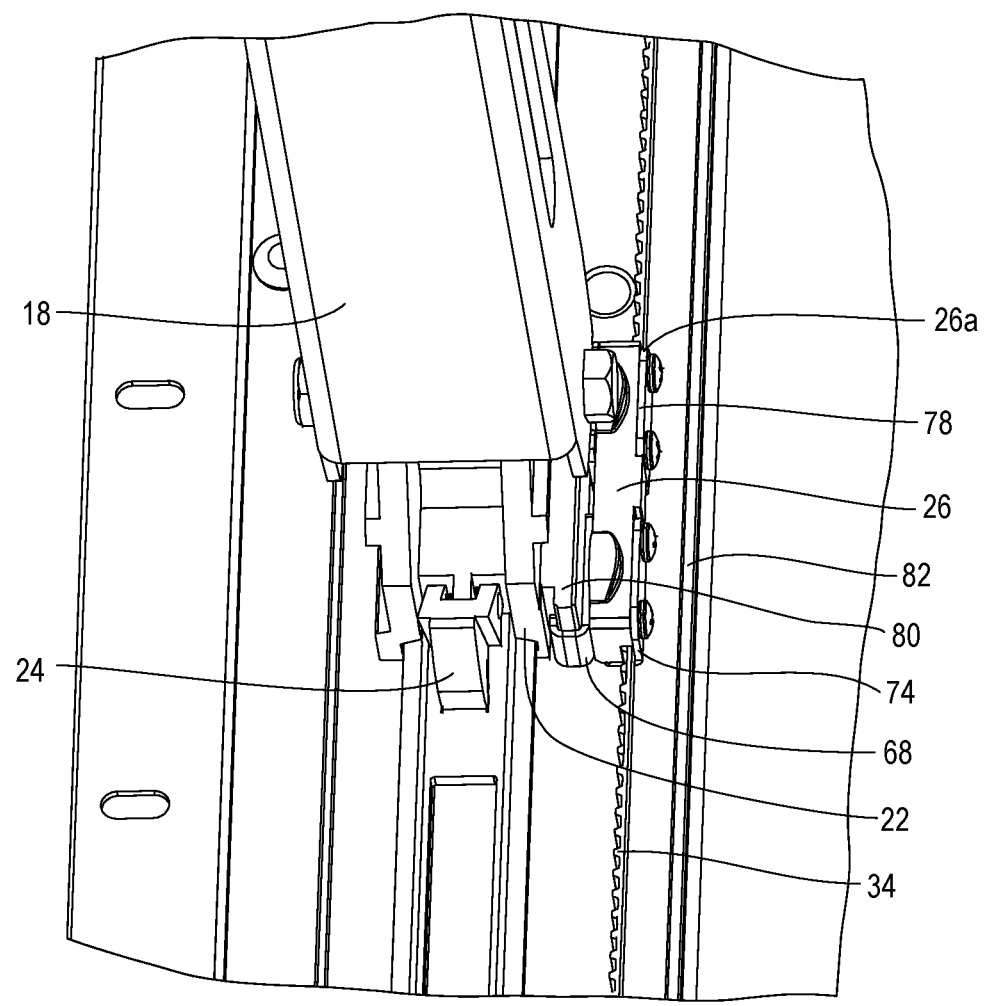
FIG. 8 is an enlarged perspective view of the bracket coupled to the carrier through a connector in accordance with certain aspects of the present disclosure.
Figure 9:
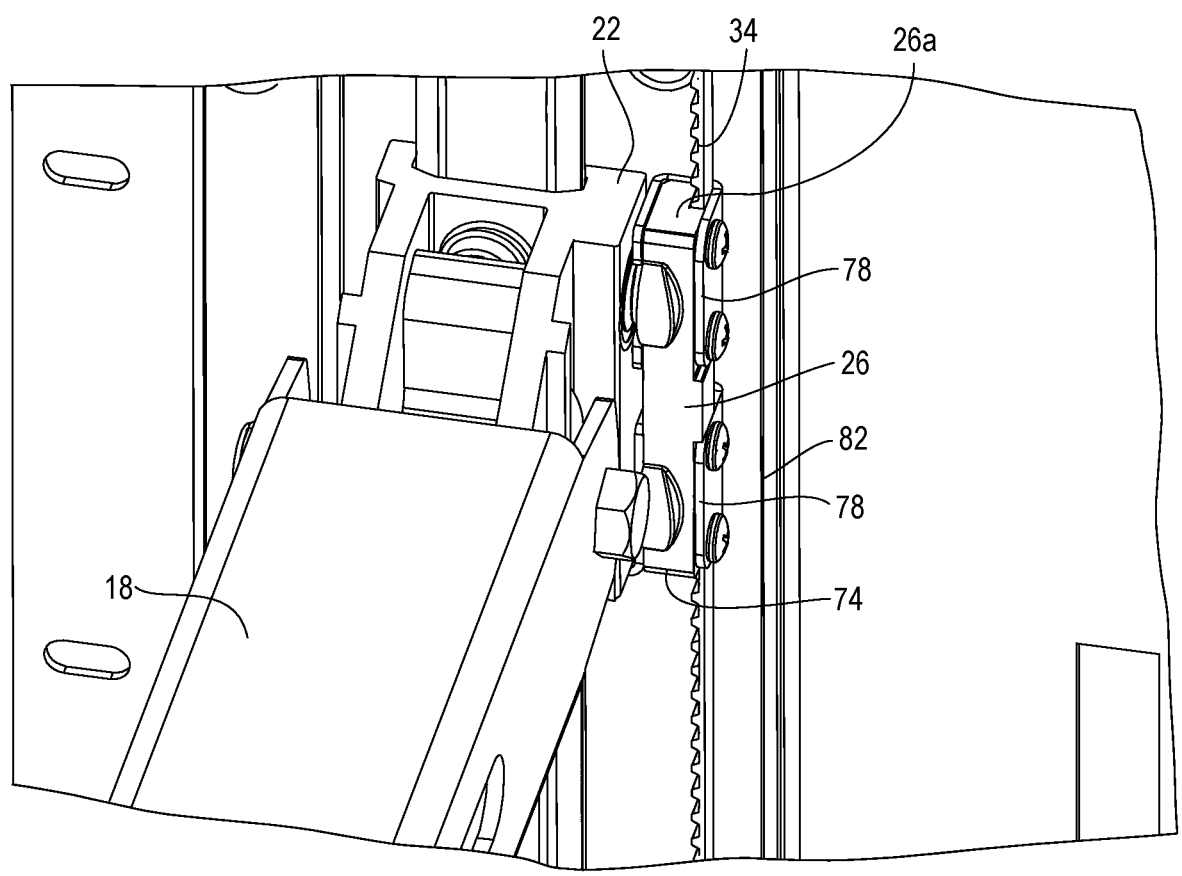
FIG. 9 is an enlarged perspective view of the bracket coupled to and aligned with the carrier through the aligners in accordance with certain aspects of the present disclosure.

In some embodiments, as shown in FIGS. 8-9, the belt 34 is disposed between the bracket 22 and a flange 82 of the track such that the carrier 26 attached to the belt 34 may only be moved within the space between the bracket 22 and the flange 82 to the extent the belt 34 may be stretched. One end of the belt 34 may be fixedly secured (e.g., by a set of screws or other suitable means) to the upper end 26a of the carrier 26, wrapped around a series of pulleys, and then the other end of the same belt 34 is attached to the bottom end 74 of the carrier 26 and thus forming a loop, such that motion of the belt 34 will cause the same motion of the carrier 26. In some embodiments, for example as shown in FIGS. 7-9, at least one surrounding component 78 may be provided (e.g., disposed between the screws and the belt/carrier) to facilitate securing the belt 34 to the carrier 26. The belt 34 extending from the bottom end 74 of the carrier 26 may extend downwardly towards the lower end 21a of the track and wrap around the lower idling pulley 36 (FIGS. 4 and 6). Then the belt 34 may extend upwardly towards the upper end 21b of the track, wrap around the upper idling pulley 38a and the upper drive pulley 38c attached to the shaft 40 of the motor 28, and around the upper idling pulley 38b, and then extend downwardly to be attached to the upper end 26a of the carrier 26. It will be appreciated that the configurations and arrangements of the bracket, carrier, belt, pulleys, and motor may be varied as needed and/or desired, without departing from the scope of the present invention, but must be such that the carrier 26 attached to the belt 34 can be coupled to the bracket 22 to form the breakaway system 10, and the formed breakaway system 10 can be moved with respect to the track by operation of the motor 28 through the belt 34 attached to the carrier 26.

In some embodiments, as shown in FIGS. 7-9, the bracket 22 may be configured to be coupled to the carrier 26 through a connector 68 while being aligned with the carrier 26 through an alignment force between first and second aligners 52, 54 disposed respectively on the bracket 22 and the carrier 26 (discussed in further detail below). As described in greater detail below, when the bracket 22 is coupled to the carrier 26, the bracket may be supported by the connector 68, such that the beam assembly 14 coupled to the bracket 22 may be raised and lowered along the respective track when the carrier 26 is urged by the drive system 32 to move up and down with respective to the respective track. The alignment force between the first and second aligners 52, 54 may facilitate keeping the bracket 22 and the carrier 26 aligned during their upward and downward motion, and may also contribute to supporting the beam assembly 14 during the motion.

Figure 10:
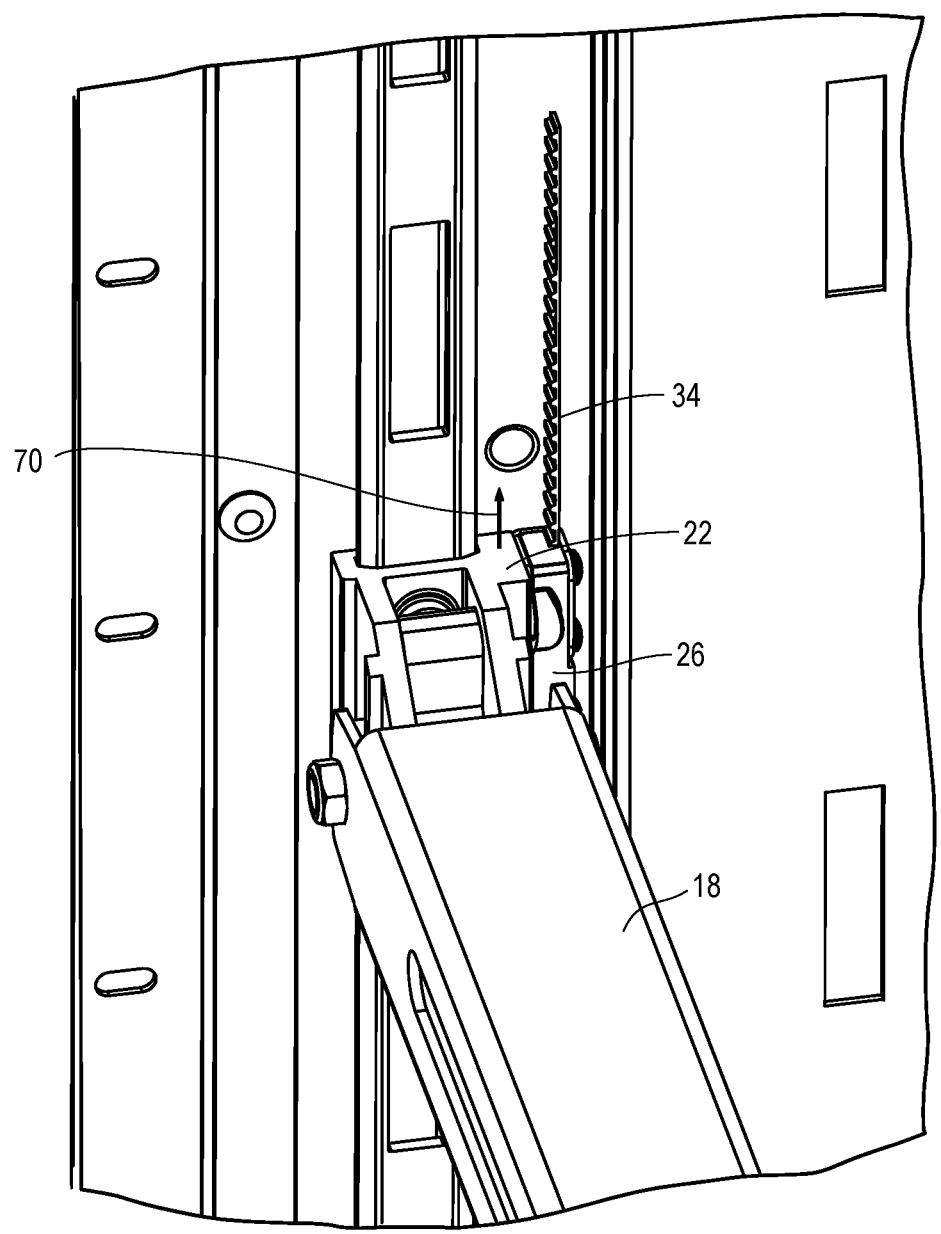
FIG. 10 is an illustration showing an upward force being applied to the bracket when the bracket is aligned with and coupled to the carrier in accordance with certain aspects of the present disclosure.

As described in greater detail below, the bracket 22 and the carrier 26 may be configured such that when the beam assembly 14 is fixed with respect to the track and when an upward force 70 (e.g., as shown in FIG. 10) that is stronger than the alignment force between the first and second aligners 52, 54 is applied to the beam assembly 14 or the bracket 22, the bracket 22 may disengage from the carrier 26 such that the beam assembly 14 coupled to the bracket 22 is also separated from the carrier 26 and is free to move upwardly along the respective track without corresponding upward motion of the carrier 26 along the respective track. In use, the beam assembly 14 and/or the bracket 22 coupled thereto may be forced up by some unintended means (e.g., using a forklift). This configuration provides the ability to minimize the potential damage to the decking system 12 and the motor/transmission/carrier caused by the unintended force lifting the beam assembly 14 and/or the bracket 22, thereby providing a decking system 12 that will not be easily damaged by misuse of forklifts or other upward forces or impediments below the beam that impedes downward motion thereof.

Figure 11:
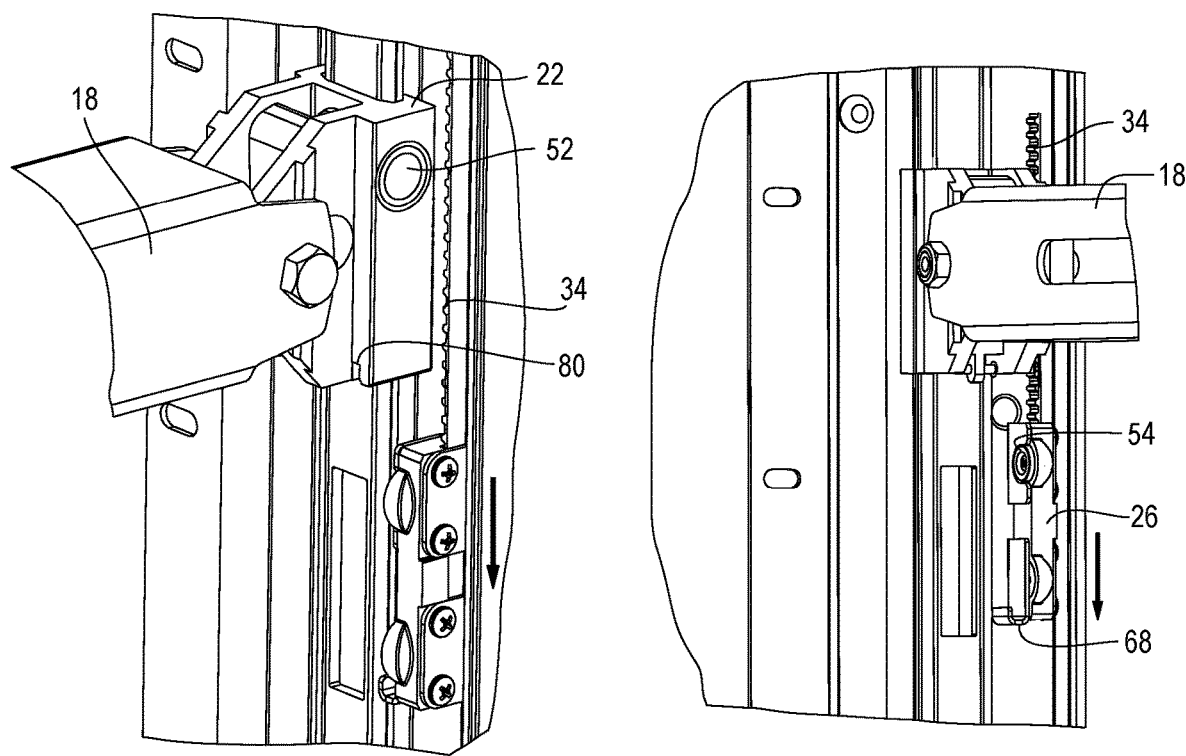
FIG. 11 is perspective views showing the carrier continues to slide downwardly along the track without corresponding downward motion of the bracket after the bracket is separated from the carrier by an upward force in accordance with certain aspects of the present disclosure.

As described in greater detail below, the bracket 22 and the carrier 26 may be configured such that when the operation of the motor 28 causes the breakaway system 10 (the carrier 26 coupled to the bracket 22) and the beam assembly 14 coupled to the breakaway system 10 to move downwardly and when the beam assembly 14 encounters a resistance force (e.g., an upward force 70 as shown in FIG. 10) that is stronger than the alignment force between the first and second aligners 52, 54, the bracket 22 may disengage from the carrier 26 such that the beam assembly 14 coupled to the bracket 22 is also separated from the carrier 26, which allows the carrier 26 to continue to slide downwardly along the respective track without corresponding downward motion of the bracket 22 and the beam assembly 14 coupled to the bracket 22 (e.g., as shown in FIG. 11). In use, during the downward motion, the beam assembly 14 may encounter obstructions, such as a cargo placed underneath or a person standing underneath the moving beam assembly 14. This configuration provides the ability to minimize the potential damage to the decking system 12 caused by the obstruction and also to minimize the potential damage to the cargo and injury to the person.

In some embodiments, as shown in FIGS. 7-9, the bracket 22 may include a first sidewall 44, and the carrier 26 may include a second sidewall 48 that faces the first sidewall 44 when the bracket 22 is coupled to the carrier 26. The first and second sidewalls 44, 48 may be configured such that the bracket 22 may be coupled to and aligned with the carrier 26 to collectively form the breakaway system 10 that may be raised and lowered by the drive system 32.

The first sidewall 44 may include a first surface 46, and the second sidewall 48 may include a second surface 50 that faces the first surface when the bracket 22 is coupled to the carrier 26. In some embodiments, the first surface 46 and the second surface 50 may have substantially the same shape and dimension, such as a generally rectangular shape (e.g., FIG. 7), such that when the bracket 22 and the carrier 26 are coupled together, the first surface 46 and the second surface 50 are substantially aligned with each other horizontally and vertically. It will be appreciated that the configuration and dimension of the first and second surfaces 46, 50 may be varied as desired and/or needed without departing from the scope of the present invention.

The bracket 22 may include at least one first aligner 52 disposed on the first surface 46 and the carrier 26 may include at least one second aligner 54 disposed on the second surface 50. The at least one first aligner 52 and the at least one second aligner 54 are disposed such that the first and second surfaces 46, 50 may be aligned and releasably coupled to each other through the alignment force between the respective first and second aligners 52, 54. For the sake of brevity, a breakaway system 10 disclosed herein is described and depicted as including a bracket 22 having one first aligner 52 and a carrier 26 having one second aligner 54. One of ordinary skill in the art, with a thorough review of the subject specification and figures, will readily comprehend that the bracket 22 and the carrier 26 may be provided with two or more aligners and how the two or more first and second aligners may be disposed and spaced along the respective bracket 22 and carrier 26.

In some embodiments, the alignment force may be achieved through magnetic attraction between the respective first and second aligners 52, 54. For example, as shown in FIGS. 7-9, the first and second aligners 52, 54 are permanent magnets that are of opposite polarities at the mating surfaces 52a, 54a. In some embodiments, the first and second aligners 52, 54 may be manufactured separately and then installed in the respective bracket 22 and carrier 26. For example, as shown in FIGS. 7 and 9, the first aligner 52 is installed in the first sidewall 44 (e.g., using screws) such that the mating surface 52a of the first aligner 52 is substantially coplanar with the first surface 46. The second aligner 54 is installed in the second sidewall 48 (e.g., using screws) such that the mating surface 54a of the second aligner 54 is substantially coplanar with a surrounding surface 78a of the surrounding component 78, which allows the bracket 22 and the carrier 26 to be aligned and coupled through the magnetic attraction between the mating surfaces 52a, 54a of the respective first and second aligners 52. It will be appreciated that in other embodiments, where surrounding component 78 and/or other components are not provided on the second surface 50 of the second sidewall 48, the second aligner 54 may be installed in the second sidewall 48 such that the mating surface 54a of the second aligner 54 is substantially coplanar with the second surface 50.

It will be appreciated that the number, configuration, dimension, and magnetic force of the first and second aligners 52, 54 may be varied as desired and/or needed, depending on the configuration of the bracket 22 and the carrier 26, to accommodate varying design needs of the breakaway system 10. For example, the mating surfaces 52a, 54a of the first and second aligners 52, 54 may both have a generally circular configuration with substantially the same diameter that is similar to or smaller than the widths 46a, 50a of the respective first and second surfaces 46, 50. It will be appreciated that the mating surfaces 52a, 54a of the first and second aligners 52, 54 may be generally rectangular, square, or any suitable shape to allow the bracket 22 and the carrier 26 to be aligned through the alignment force between the first and second aligners 52, 54. The dimension and magnetic force of the first and second aligners 52, 54 may be selected depending on an estimated strength of the upward force 70 (discussed above), such that the upward force 70 may overcome the alignment force (or double alignment force when two breakaway systems 10 are respectively coupled to the two ends of the beam assembly 14 and the upward force 70 is applied to the beam 16) between the bracket 22 and the carrier 26 to disengage the bracket 22 from the carrier 26. To achieve a greater alignment force, a greater number of the first and second aligners 52, 54 and/or with larger dimensions may be provided (e.g., spaced along a portion of the respective first and second surfaces 46, 50). It will be appreciated that the alignment force may be achieved through any suitable methods without departing from the scope of the present invention, including but not limited to a dent/recess alignment, a latch, or a spring-loaded bolt. For the sake of brevity, a modification to include these well-known components will not be fully described here and one of ordinary skill in the art with a thorough review of this specification and figures will readily comprehend how the first and second aligners could be provided with these structures for similar operation as the permanent magnets discussed in detail herein.

The bracket 22 may include a receiving portion 80 having a slot 58 and a bottom portion 56. The slot 58 may extend a depth 58c from the bottom end 76 of the first sidewall 44 with a generally rectangular cross section having a length 58a and a width 58b. The bottom portion 56 may be disposed between the slot 58 and the first surface 46 and may have the same depth 58c with a generally rectangular cross section having the same length 58a and a width 58b. In some embodiments, the length 58a may be substantially the same as the width 46a of the first surface 46.

The carrier 26 may include a connector 68 configured such that the bracket 22 may be releasably coupled to and supported by the carrier 26 through the connector 68. In some embodiments, as shown in FIG. 7, the connector 68 may have a generally J-shaped configuration, including a suspending portion 62, a finger 64, and an intermediate portion 66 disposed between the suspending portion 62 and the finger 64. The suspending portion 62 may be attached to the second surface 50 and extend downward from a first position 72 below the at least one second aligner 54 towards a bottom end 74 of the carrier 26. In some embodiments, the suspending portion 62 may have an outer surface 62b that is substantially coplanar with the surrounding surface 78a of the surrounding component 78, such that when the first and second aligners 52, 54 are coupled together, the first surface 46 will contact the outer surface 62b of the suspending portion 62, thereby forming a relatively tight fit between the bracket 22 and the carrier 26 to provide additional support to the bracket 22, facilitate stabilizing the bracket 22, and minimize relative movement between the bracket 22 and the carrier 26 during upward and downward motion.

The intermediate portion 66 may include a generally flat portion 66a having a length 66d and two chamfered portions 66b, 66c extending from the two ends of the flat portion 66a, such that the finger 64 and the suspending portion 62 are respectively connected to the chamfered portions 66b, 66c disposed on the two ends of the intermediate portion 66. The finger 64 may extend upward from the chamfered portion 66b for a length 64a with a generally rectangular cross section having a width 64b. A groove 60 may be established between the finger 64 and the suspending portion 62 and have a width 60a that is greater than the length 66d of the flat portion 66a.

The width 60a of the groove 60 may be slightly larger than the width 56a of the bottom portion 56, and the width 64b of the finger 64 may be slightly smaller than the width 58b of the slot 58, such that at least a portion of the bottom portion 56 may be received within the groove 60 while at least a portion of the finger 64 being received within the slot 58. The length 64a of the finger 64 may be similar to or slightly smaller than the depth 58c of the slot 58, such that when received within the slot 58, the finger 64 may provide additional horizontal and vertical support to the bracket 22, minimize the horizontal and vertical movement of the bracket 22 with respect to the carrier 26 during the upward and downward motion, and thereby facilitating aligning the bracket 22 with the carrier 26. The chamfered portions 66b, 66c may provide clearance for the bottom portion 56 of the bracket 22 to be received within the groove 60 when the bracket 22 is moved downwardly with respective to the carrier 26.

The configuration of the connector 68 and the receiving portion 80 provides a secure positive interlock connection between the bracket 22 and the carrier 26, which allows the connector 68 to couple the bracket 22 to the carrier 26 while providing support to the bracket 22 as the bracket 22 and the carrier 26 are moved upwardly and downwardly with respect to the respective track by the drive system 32. That is, when the carrier 26 and bracket 22 are moving upwardly, a downward force on the bracket 22 (and/or the beam assembly 14 coupled to the bracket 22) will be supported by the positive bracket 22 interlock with the carrier 26.

When the carrier 26 and bracket 22 are fixed with respect to the respective track, this configuration allows the bracket 22 to disengage from the carrier 26 coupled to the bracket 22 when the bracket 22 (and/or the beam assembly 14 coupled to the bracket 22) is forced up by an upward force (e.g., applied by a forklift lifting cargo against the underside of the beam). When the carrier 26 and bracket 22 are moving downwardly (without cargo loaded on the beam assembly 14), the configuration of the connector 68 and the receiving portion 80 allows the bracket 22 to be disengaged from the carrier 26 if the bracket 22 (and/or the beam assembly 14 coupled to the bracket 22) comes in contact with an obstruction (e.g., a cargo or a person) as they are moving downwardly. When the obstruction is removed or the person gets out of the way, the bracket 22 and the carrier 26 may be rejoined by lowering the bracket 22 onto the carrier 26 (or allowing the bracket 22 to drop back by gravity into contact with the carrier 26) or raising the carrier 26 to meet the bracket 22, such that the interlock connection is formed between the connector 68 and the receiving portion 80. In both cases, the first and second aligners 52, 54 will urge the receiving portion 80 to align with the connector 68, thereby facilitating rejoining the bracket 22 and the carrier 26.

It will be appreciated that the configuration and dimension of the connector 68 and the receiving portion 80 may be varied as needed and/or desired, without departing from the scope of the present invention, but the configuration and dimension must be such that the bracket 22 can be coupled to and supported by the carrier 26 through the connector 68 and the receiving portion 80, thereby allowing the carrier 26 and the drive system 32 to support the bracket 22 (e.g., and also the beam assembly 14 coupled to the bracket 22) as the bracket 22 and the carrier 26 are moved upwardly and downwardly with respect to the track. For example, in some embodiments, the connector 68 may extend horizontally from a bottom surface 74a of the carrier 26 and then have an upstanding portion that extends within the slot 58 (and therefore may be an L shape instead of a J shape).

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

I claim:

1. A remotely adjustable decking system, comprising:
   first and second vertical tracks that are configured to be installed upon opposing walls of cargo compartment, the first and second vertical tracks each comprise a plurality of apertures disposed spacingly therealong;
   first and second brackets that each slide along the respective first and second tracks;
   first and second carriers that each are releasably coupled during use of the decking system to the respective first and second brackets, and wherein the first and second carriers slide within the respective first and second tracks;
   at least one motor that is disposed in conjunction with the respective first and second tracks, wherein the at least one motor is operatively engaged with the respective first and second carriers through a drive system that is urged to move by the at least one motor, wherein operation of the at least one motor in a first direction causes the respective carrier and the respective bracket, when the respective bracket is coupled to the respective carrier, to slide upwardly along the respective track, and operation of the at least one motor in an opposite second direction causes the respective carrier and the respective bracket, when the respective bracket is coupled to the respective carrier, to slide downwardly along the respective track; and
   a controller with user input capability, wherein the controller selectively controls the operation of the at least one motor to selectively raise or lower a vertical position of one or both of the first and second carriers upon the respective first and second tracks in response to an input received from an input device.

2. The remotely adjustable decking system of claim 1, wherein the at least one motor is first and second motors that are disposed in conjunction with the respective first and second tracks and the first and second motors are each operatively engaged with the respective first and second carriers.

3. The remotely adjustable decking system of claim 1, wherein the drive system is a belt drive, wherein the first and second carriers each are coupled to respective first and second belts, and wherein the respective first and second belts each wrap around a respective first set of pulleys and a respective second set of pulleys.

4. The remotely adjustable decking system of claim 1, further comprising an elongate decking beam disposed between and fixed to the first and second brackets.

5. The remotely adjustable decking system of claim 4, wherein the first and second brackets each comprise a first sidewall and the first and second carriers each comprise a second sidewall, wherein the first sidewall of each bracket faces and is aligned with the second sidewall of the respective carrier when the respective carrier is coupled to the respective bracket.

6. The remotely adjustable decking system of claim 5, wherein each of the first and second carriers comprises a connecter that is configured to engage and support the respective bracket when the carrier and the respective bracket are coupled together, wherein the connecter is configured to allow the carrier and the drive system to support the respective bracket as the respective bracket and the carrier are moved with respect to the respective track.

7. The remotely adjustable decking system of claim 6, wherein at least a portion of the connecter is configured to be received within a slot in the respective bracket.

8. The remotely adjustable decking system of claim 7, wherein the connecter comprises a suspending portion, a finger, and an intermediate portion connecting the suspending portion and the finger, and wherein the connecter is configured such that a groove is established between the suspending portion and the finger.

9. The remotely adjustable decking system of claim 5, wherein the first sidewall of each bracket comprises a first aligner and the second sidewall comprises a second aligner, and wherein the first and second aligners are configured to be releasably coupled through an alignment force between each first aligner and the respective second aligner such that each bracket is coupled to and aligned with the respective carrier.

10. The remotely adjustable decking system of claim 9, wherein the alignment force is achieved through magnetic attraction.

11. The remotely adjustable decking system of claim 9, wherein when the elongate decking beam is fixed with respect to the first and second tracks and when an upward force that is stronger than the alignment force between the respective first and second aligners is applied to one or both of the first and second brackets, one or both of the first and second brackets each disengage from the respective first and second carriers such that the elongate decking beam is separated from the respective first and second carriers and is free to move upwardly along the respective first and second tracks without corresponding upward motion of the respective first and second carriers along the respective first and second tracks.

12. The remotely adjustable decking system of claim 9, wherein when the operation of the at least one motor causes the elongate decking beam to move downwardly and when the elongate decking beam encounters a resistance force that is stronger than the alignment force between the respective first aligners and the respective second aligners, the first and second brackets each disengage from the respective first and second carriers such that the elongate decking beam is separated from the first and second carriers, such that the first and second carriers are free to continue to slide downwardly along the respective first and second tracks without corresponding downward motion of the first and second brackets.

13. A breakaway system for use with a decking system, comprising:
    a bracket that is configured to be capable of sliding along a track; and
    a carrier that is releasably coupled to the bracket,
    wherein the bracket and the carrier are configured to be separated when an upward force is applied upon the bracket and not upon the carrier.

14. The breakaway system for use with a decking system of claim 13, wherein the bracket comprises a first sidewall and the carrier comprises a second sidewall, wherein the first sidewall of the bracket faces and is aligned with the second sidewall of the carrier when the carrier is releasably coupled to the bracket.

15. The breakaway system for use with a decking system of claim 14, wherein the carrier comprises a connecter that is configured to engage and support the bracket when the carrier and the bracket are coupled, wherein the connecter is configured to allow the carrier to support the bracket as the bracket and the carrier are moved with respect to the track.

16. The breakaway system for use with a decking system of claim 15, wherein at least a portion of the connecter is configured to be received within a slot in the bracket when the bracket is coupled to the carrier.

17. The breakaway system for use with a decking system of claim 14, wherein the first sidewall comprises a first aligner and the second sidewall comprises a second aligner, and wherein the first and second aligners are configured to be releasably coupled through an alignment force between the first aligner and the second aligner such that the bracket is coupled to and aligned with the carrier.

18. The breakaway system for use with a decking system of claim 17, wherein when the bracket coupled to the carrier is fixed with respect to the track, and when an upward force that is stronger than the alignment force between the first and second aligners is applied to the bracket, the bracket disengages from the carrier such that the bracket is separated from the carrier and is free to move upwardly along the track without corresponding upward motion of the carrier along the track.

19. The breakaway system for use with a decking system of claim 17, wherein when the bracket coupled to the carrier is operated to move downwardly, and when the bracket encounters a resistance force that is stronger than the alignment force between the first and second aligners, the bracket disengages from the carrier, such that the carrier is free to continue to slide downwardly along the track without corresponding downward motion of the bracket.

20. A remotely adjustable decking system, comprising:
    first and second vertical tracks that are configured to be installed upon opposing walls of cargo compartment, the first and second vertical tracks each comprise a plurality of apertures disposed spacingly therealong;
    first and second brackets that each slide along the respective first and second tracks;
    first and second carriers that each are releasably coupled to the respective first and second brackets, and wherein the first and second carriers slide within the respective first and second tracks;
    at least one motor that is disposed in conjunction with the respective first and second tracks, wherein the at least one motor is operatively engaged with the respective first and second carriers through a drive system that is urged to move by the at least one motor, wherein operation of the at least one motor in a first direction causes the respective carrier and the respective bracket, when the respective bracket is coupled to the respective carrier, to slide upwardly along the respective track, and operation of the at least one motor in an opposite second direction causes the respective carrier and the respective bracket, when the respective bracket is coupled to the respective carrier, to slide downwardly along the respective track; and
    a controller with user input capability, wherein the controller selectively controls the operation of the at least one motor to selectively raise or lower a vertical position of one or both of the first and second carriers upon the respective first and second tracks in response to an input received from an input device,
    further comprising an elongate decking beam disposed between and fixed to the first and second brackets,
    wherein the first and second brackets each comprise a first sidewall and the first and second carriers each comprise a second sidewall, wherein the first sidewall of each bracket faces and is aligned with the second sidewall of the respective carrier when the respective carrier is coupled to the respective bracket,
    wherein the first sidewall of each bracket comprises a first aligner and the second sidewall comprises a second aligner, and wherein the first and second aligners are configured to be releasably coupled through an alignment force between each first aligner and the respective second aligner such that each bracket is coupled to and aligned with the respective carrier,
    wherein when the elongate decking beam is fixed with respect to the first and second tracks and when an upward force that is stronger than the alignment force between the respective first and second aligners is applied to one or both of the first and second brackets, one or both of the first and second brackets each disengage from the respective first and second carriers such that the elongate decking beam is separated from the respective first and second carriers and is free to move upwardly along the respective first and second tracks without corresponding upward motion of the respective first and second carriers along the respective first and second tracks.

* * * * *